United States Patent
Wang et al.

(10) Patent No.: US 10,783,054 B2
(45) Date of Patent: Sep. 22, 2020

(54) METHOD, APPARATUS, AND DEVICE FOR STORING OPERATION RECORD BASED ON TRUSTED EXECUTION ENVIRONMENT

(71) Applicant: Alibaba Group Holding Limited, George Town (KY)

(72) Inventors: Lei Wang, Hangzhou (CN); Xinying Yang, Hangzhou (CN); Qingkai Mao, Hangzhou (CN); Mengyun Zhao, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/815,906

(22) Filed: Mar. 11, 2020

(65) Prior Publication Data

US 2020/0210314 A1 Jul. 2, 2020

Related U.S. Application Data

(63) Continuation of application No. PCT/CN2020/071343, filed on Jan. 10, 2020.

(30) Foreign Application Priority Data

Jul. 29, 2019 (CN) .......................... 2019 1 0689295

(51) Int. Cl.
*H04L 29/06* (2006.01)
*G06F 11/34* (2006.01)
(Continued)

(52) U.S. Cl.
CPC .......... *G06F 11/3476* (2013.01); *G06F 21/53* (2013.01); *G06N 20/00* (2019.01); *H04L 9/0637* (2013.01); *H04L 9/0643* (2013.01)

(58) Field of Classification Search
CPC ..... G06F 11/3476; G06F 21/53; G06N 20/00; H04L 9/0637; H04L 9/0643
See application file for complete search history.

(56) References Cited

U.S. PATENT DOCUMENTS

| 10,558,826 B2 * | 2/2020 | Yau ........................ G06F 21/577 |
| 2012/0110644 A1 * | 5/2012 | Thom ..................... G06F 21/57 726/4 |

(Continued)

FOREIGN PATENT DOCUMENTS

| CN | 106548091 | 3/2017 |
| CN | 107665219 | 2/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Ghodrat Jamshidi
(74) *Attorney, Agent, or Firm* — Fish & Richardson P.C.

(57) ABSTRACT

In an implementation, operation instructions indicating application data to be used for performing one or more operations sent by a first client device are received. The application data is determined based on the operation instructions. One or more second client devices associated with the application data are determined. Operation codes in a trusted execution environment (TEE) associated with the application data to be executed are determined. That the operation codes has been executed for K times based on an indicator is determined. The operation codes are executed in the TEE based on the application data to generate an operation log. An indicator indicating a number of times the operation codes are executed is updated. The operation log and the indicator are sent as an operation record to a (Continued)

database server, the first client device, and the one or more second client devices to be stored.

18 Claims, 4 Drawing Sheets

(51) Int. Cl.
*G06N 20/00* (2019.01)
*G06F 21/53* (2013.01)
*H04L 9/06* (2006.01)

(56) References Cited

U.S. PATENT DOCUMENTS

| | | |
|---|---|---|
| 2013/0067575 A1 | 3/2013 | Zuk |
| 2018/0196694 A1* | 7/2018 | Banerjee ............. G06F 13/1642 |
| 2018/0254898 A1* | 9/2018 | Sprague ................ H04L 9/0637 |
| 2018/0288060 A1* | 10/2018 | Jackson ............. H04L 63/1408 |
| 2019/0068360 A1* | 2/2019 | Bhattacharya ........ H04L 9/3297 |
| 2019/0229891 A1* | 7/2019 | Naqvi ................... H04L 9/0819 |
| 2019/0373475 A1* | 12/2019 | Top ................. H04W 12/00407 |
| 2019/0377724 A1* | 12/2019 | Pennington .......... G06Q 20/381 |
| 2020/0067922 A1* | 2/2020 | Avetisov ............... H04L 9/0643 |

FOREIGN PATENT DOCUMENTS

| | | |
|---|---|---|
| CN | 108711051 | 10/2018 |
| CN | 109190410 | 1/2019 |
| CN | 109670312 | 4/2019 |
| CN | 109902071 | 6/2019 |
| CN | 110046281 | 7/2019 |

OTHER PUBLICATIONS

Nakamoto, "Bitcoin: A Peer-to-Peer Electronic Cash System," www.bitcoin.org, 2005, 9 pages.

* cited by examiner

METHOD, APPARATUS, AND DEVICE FOR STORING OPERATION RECORD BASED ON TRUSTED EXECUTION ENVIRONMENT

CROSS-REFERENCE TO RELATED APPLICATIONS

This application is a continuation of PCT Application No. PCT/CN2020/071343, filed on Jan. 10, 2020, which claims priority to Chinese Patent Application No. 201910689295.0, filed on Jul. 29, 2019, and each application is hereby incorporated by reference in its entirety.

TECHNICAL FIELD

Implementations of the present specification relate to the field of information technologies, and in particular, to methods, apparatuses, and devices for storing an operation record based on a trusted execution environment (TEE).

BACKGROUND

As technologies develop, data sharing is becoming more common. Specifically, a plurality of organizations share application data of the same type by using a platform. Any organization can use the application data in the platform and perform statistics collection, data classification, machine learning, etc. in the platform.

In this process, the data stored in the platform is not completely free. For example, user A provides a large amount of data and wants to charge for the provided data. Because operations on the application data are actually performed in the platform, when user B uses the data provided by user A, the platform may join user B to cheat user A. For example, each time user B uses the data provided by user A, the platform rolls back the data to eliminate the trace of use left by user B.

In view of this, a solution for storing a tamperproof operation record is needed.

SUMMARY

Implementations of the present application aim to provide solutions for storing a tamperproof operation record.

To solve the previous technical problem, the implementations of the present application are implemented as follows:

According to one aspect, an implementation of the present specification provides a method for storing an operation record based on a trusted execution environment (TEE). The method is applied to an application server and includes: receiving an operation instruction sent by a first client, and determining needed application data based on the operation instruction; determining one or more second clients corresponding to the application data; executing predetermined operation code in the TEE based on the application data, and generating an operation log with respect to the application data; determining a quantity K of execution times of the operation code before executing the operation code, and changing the quantity of execution times to K+1 when executing the operation code in the TEE; and generating an operation record that includes the operation log and the quantity K+1 of execution times, and sending the operation record to a database server, the first client, and the second client, so that the database server stores the operation record.

According to another aspect, an implementation of the present specification provides a method for storing an operation record based on a TEE. The method is applied to a database server and includes: receiving an operation record sent by an application server, and determining a hash value of the operation record, where the operation record includes an operation log and a quantity K+1 of execution times of operation code, and the operation record is generated by the application server in the TEE; and writing the operation record to a blockchain-type ledger that stores data based on a blockchain data structure (e.g., in a form of a blockchain) to generate an Nth data block that includes a hash value of the data block and the operation record, when a predetermined block forming condition is satisfied, specifically including: when N=1, giving a hash value and height of an initial data block based on a predetermined method; or when N>1, determining the hash value of the Nth data block based on operation records to be written to the data block and a hash value of an (N−1)th data block, and generating the Nth data block that includes the hash value of the Nth data block and the operation records, where the height of the data block increases monotonically in a sequence of block forming time.

Corresponding to the one aspect, an implementation of the present specification provides an apparatus for storing an operation record based on a TEE. The apparatus is applied to an application server and includes: a receiving module, configured to receive an operation instruction sent by a first client, and determine needed application data based on the operation instruction; a determining module, configured to determine one or more second clients corresponding to the application data; a TEE execution module, configured to execute predetermined operation code in the TEE based on the application data, and generate an operation log with respect to the application data; a TEE counting module, configured to determine a quantity K of execution times of the operation code before the operation code is executed, and change the quantity of execution times to K+1 when the operation code is executed in the TEE; and a sending module, configured to generate an operation record that includes the operation log and the quantity K+1 of execution times, and send the operation record to a database server, the first client, and the second client so that the database server stores the operation record.

Corresponding to the another aspect, an implementation of the present specification provides an apparatus for storing an operation record based on a TEE. The apparatus is applied to a database server and includes: a receiving module, configured to receive an operation record sent by an application server, and determine a hash value of the operation record, where the operation record includes an operation log and a quantity K+1 of execution times of operation code, and the operation record is generated by the application server in the TEE; and a generation module, configured to write the operation record to a blockchain-type ledger to generate an Nth data block that includes a hash value of the data block and the operation record, when a predetermined block forming condition is satisfied, specifically including: when N=1, giving a hash value and height of an initial data block based on a predetermined method; or when N>1, determining the hash value of the Nth data block based on operation records to be written to the data block and a hash value of an (N−1)th data block, and generating the Nth data block that includes the hash value of the Nth data block and the operation records, where the height of the data block increases monotonically in a sequence of block forming time.

According to the solutions provided in the implementations of the present specification, when a user performs a data operation on a platform, the platform executes predetermined code in the TEE to perform an operation on data selected by the user, and generates a corresponding operation log. In addition, counting is performed when the predetermined code is executed in the TEE. The count is increased by 1 each time the code is executed. The operation log and a counting result are combined to generate an operation record. The operation record is written to a blockchain-type ledger on the database server. As such, an undeniable evidence of consecutive counts is formed in the blockchain-type ledger. Any user can check the ledger at any time to determine how many times the user's data has been used, and who uses the data. Therefore, a record related to data use is tamperproof.

It should be understood that the previous general description and the following detailed description are merely exemplary and explanatory, and are not intended to limit the implementations of the present specification.

In addition, an implementation of the present specification does not need to achieve all the previous effects.

BRIEF DESCRIPTION OF DRAWINGS

To describe the technical solutions in the implementations of the present specification or in the existing technology more clearly, the following briefly describes the accompanying drawings needed for describing the implementations or the existing technology. Clearly, the accompanying drawings in the following description merely show some implementations of the present specification, and a person of ordinary skill in the art can still derive other drawings from these accompanying drawings.

DESCRIPTION OF IMPLEMENTATIONS

To make a person skilled in the art better understand the technical solutions in the implementations of the present specification, the following describes in detail the technical solutions in the implementations of the present specification with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope of the present specification.

Figure 1:
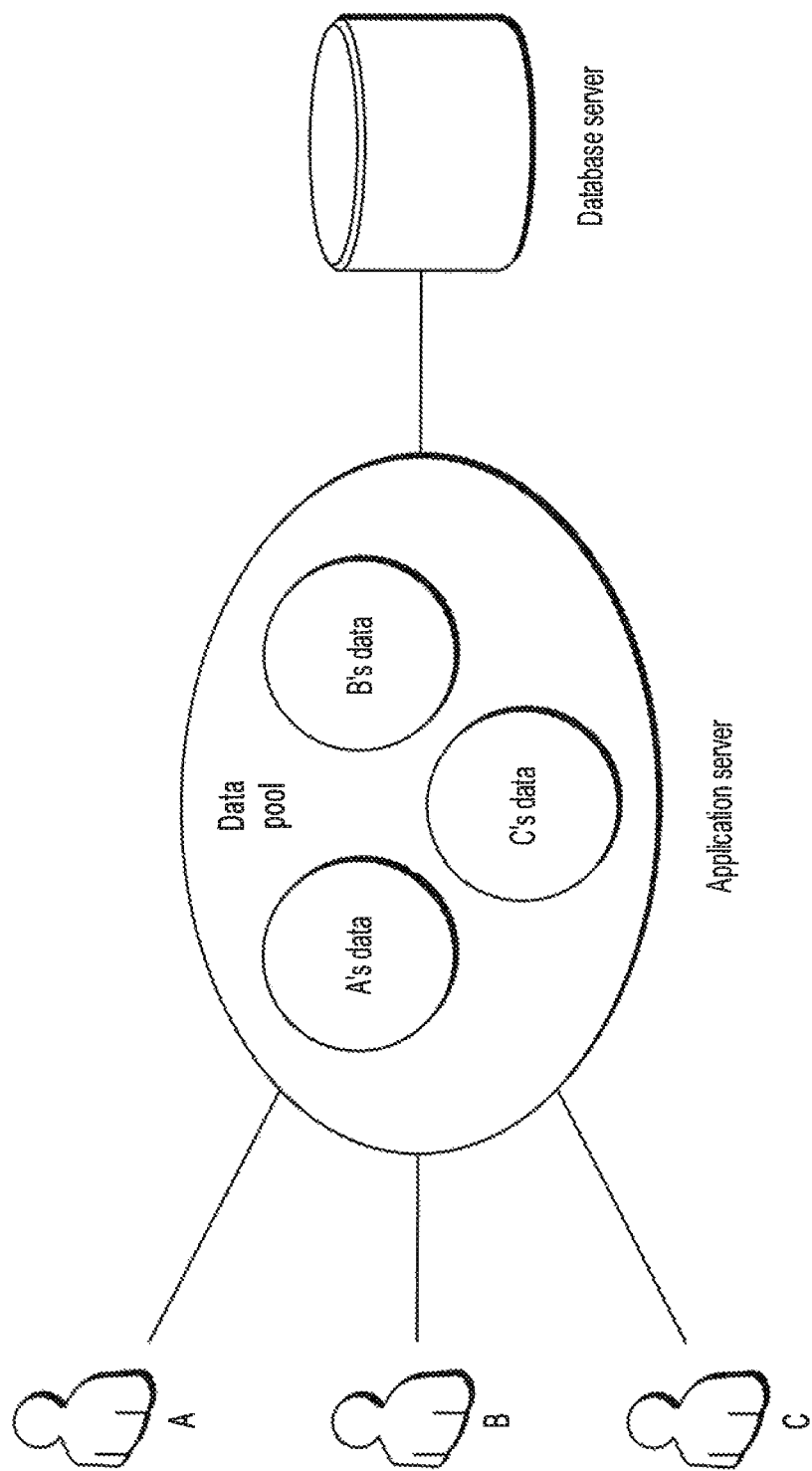
FIG. 1 is a schematic diagram illustrating a system architecture related to implementations of the present specification.

With in-depth applications of big data, breadth of data receives more attention. In this case, a mode in which a plurality of users share data by using a shared platform (that is, an application server) emerges. FIG. 1 is a schematic diagram illustrating a system architecture related to implementations of the present specification. A plurality of users (which can be individuals or organizations) upload data to a platform, forming a data pool. The data in the data pool can be encrypted or public. Each piece of data has a specific owner in the platform.

The platform can provide one or more types of applications or code for execution by any user. Any user can call data that the user needs from the data pool, and perform corresponding statistics collection, classification, model training, etc. in the platform. The code can be alternatively maintained by a user and provided to the platform for storage and execution.

Because the data is used in the platform, the platform can monitor user behavior to avoid data theft. In addition, the platform can determine, based on data call between data pools, revenue that a data provider should collect. For example, user A and user B reach an agreement that they can use each other's data several times for free, and charges for extra usage. To prevent a certain user from colluding with the platform, the platform needs to provide a tamperproof operation record that can be verified at any time.

Figure 2:
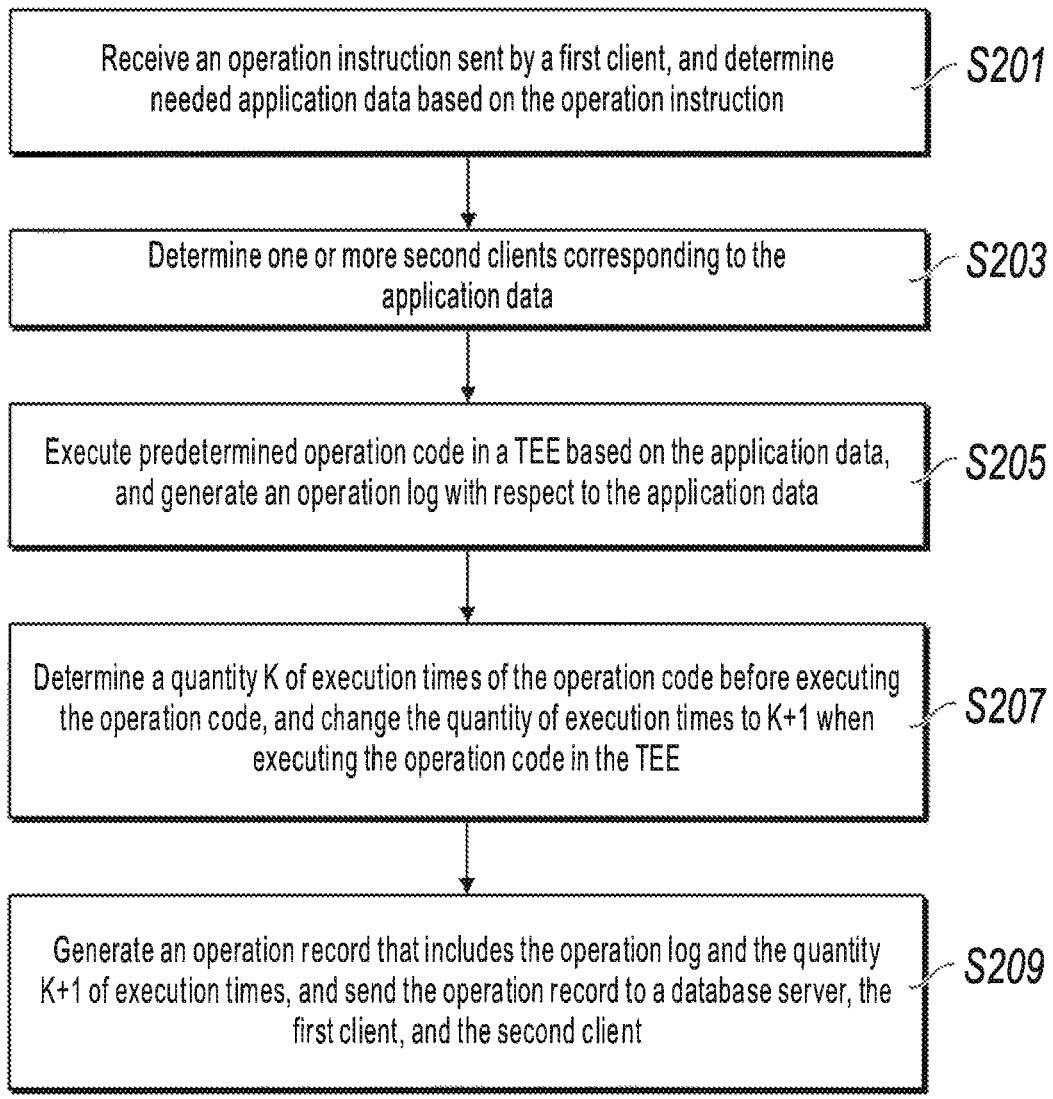
FIG. 2 is a schematic flowchart illustrating a method for storing an operation record based on a TEE, according to an implementation of the present specification.

The technical solutions provided in the implementations of the present specification are described in detail below with reference to the accompanying drawings. FIG. 2 is a schematic flowchart illustrating a method for storing an operation record based on a trusted execution environment (TEE), according to an implementation of the present specification. The procedure includes the following steps.

S201. Receive an operation instruction sent by a first client, and determine needed application data based on the operation instruction.

As described previously, the first client can log in to an application server, and send the corresponding operation instruction on the application server. Or the first client can directly send the operation instruction to the application server.

The operation instruction specifically includes selecting application data needed for a current operation from a data pool, and selecting an application program or operation code that the operation needs to use on the application server.

It is worthwhile to note that the application program or code can be provided by the application server, or can be provided by a user and stored on the application server. For example, a user provides code for a machine learning training model.

Although the application program or code is stored on the application server, the application program or code is publicly visible. A user can know the purpose and clear text of the code, thereby ensuring the impartiality of the application server.

S203. Determine one or more second clients corresponding to the application data.

After determining the needed application data, the application server can determine another user related to the application data to be used. Specifically, each piece of data can include a user identifier (ID) of a provider. In this case, the second client can be determined based on the user ID.

It is easy to understand that the called application data can be provided by one or more users. Therefore, there can be one or more second clients. As shown in FIG. 1, user A can simultaneously use data provided by user B and user C in the data pool. In this case, the second clients include clients of user B and user C.

S205. Execute predetermined operation code in the TEE based on the application data, and generate an operation log with respect to the application data.

The TEE can function as a black box in hardware. Executed code and a data operating system layer in the TEE cannot be peeped. Operations can be performed on the code only through an interface predetermined in the code. In other words, each time the code is executed through the interface, the application server can know the operation and generate a corresponding operation log.

The TEE is based on security extension of CPU hardware and is completely isolated from the outside. Originally proposed by Global Platform, the TEE aims to provide security isolation of resources on mobile devices, and provides a trusted and secure execution environment for application programs in parallel with an operating system. The ARM trust zone is the first TEE technology in actual commercial use.

Rapid development of the Internet is accompanied with the growing demands for security. Mobile devices, cloud devices, as well as data centers present more demands for the TEE. The concept of TEE also rapidly develops and expands. The current concept of TEE is broader than its original concept. For example, server chip manufacturers INTEL, AMD, etc. launch hardware-assisted TEEs and enrich the concept and characteristics of TEE, and are widely recognized in the industry. The TEE mentioned today usually means the hardware-assisted TEE technology. Different from a mobile device, a cloud device needs to access remotely. An end user is invisible to a hardware platform. Therefore, the first step for using the TEE is to confirm the authenticity of the TEE. Therefore, a remote proof mechanism is introduced to existing TEE technologies. Endorsement provided by hardware manufacturers (which are mainly CPU manufacturers) and a digital signature technology are used to ensure that the user can verify the TEE status. In other words, a result of execution in the TEE can be digitally signed by a hardware manufacturer.

In addition, data privacy protection is further proposed because the security isolation of resources alone cannot satisfy security demands. Commercial TEEs, including INTEL Software Protection Extension (SGX) and AMD SEV, further provide memory encryption technologies. Trusted hardware is limited to the inside of the CPU. Bus data and memory data are ciphertexts to prevent malicious users from snooping. For example, TEE technologies such as INTEL SGX isolate code execution, remote attestation, security configuration, secure data storage, and a trusted path for code execution. An application program running in the TEE is securely protected and almost impossible to be accessed by a third party.

For example, INTEL SGX provides an enclave, that is, an encrypted trusted execution area in memory, and a CPU protects data from being stolen. For example, a server uses a CPU supporting SGX. An enclave page cache (EPC) can be allocated in the memory by using a new processor instruction. A memory encryption engine (MEE) in the CPU is used to encrypt data in the EPC. The encrypted content in the EPC can be decrypted to a plaintext only after the CPU is accessed. Therefore, in the SGX, a user can distrust an operating system, a virtual machine monitor (VMM), or even a basic input output system (BIOS), and only needs to trust the CPU to ensure code execution.

In the present implementation of the present specification, the obtained application data is used as the input to execute the predetermined operation code.

The generated operation log can include the user ID of the first client that initiates a call of code execution, the data used for the call, the provider (the ID of the second client) of the used data. Further, the operation log can include a result of the code execution, a start time and an end time of the code execution, etc.

S207. Determine a quantity K of execution times of the operation code before executing the operation code, and change the quantity of execution times to K+1 when executing the operation code in the TEE.

As described previously, code execution in the TEE is ensured by the hardware provider. Correspondingly, in the present implementation of the present specification, each piece of independent application program or code corresponds to a count. The count represents a quantity of execution times of the code. Each time the operation code is executed, the value of the count corresponding to the code is increased by 1. That is, when there are a plurality of pieces of executable code on the application server, execution counts of the code are independent of each other.

Similarly, the TEE can maintain the value of the count and ensure its authenticity. In other words, the value of the count is digitally signed by the hardware provider corresponding to the TEE.

S209. Generate an operation record that includes the operation log and the quantity K+1 of execution times, and send the operation record to a database server, the first client, and the second client, so that the database server stores the operation record.

Because the TEE ensures authenticity and provides digital signatures for both the code execution and the count, the application server cannot modify the generated operation log and the value of the count.

As described previously, each time the code is executed, a count greater than the previous count by 1 is generated. Therefore, it can be known that the generated operation records include a consecutive natural number sequence based on count consecutiveness (that is, the counts are a consecutive natural number sequence).

The application server can send the generated operation record to the database server for storage. In addition, the application server can separately return the operation record to the first client and the second client, so that the first client or the second client can initiate query or verification to the database server at any time.

If the first client or the second client finds that an operation record including a certain count is lost in an operation record sequence (for example, the counts in the operation record sequence are 10, 11, and 13, excluding 12), it can be known that a problem exists in this process on the application server. That is, the operation record is omitted or lost instead of being stored by the application server.

In an implementation, data provided by a user can be encrypted application data. For example, the data is encrypted by using the user's public key (and can be decrypted only by using the user's private key, which can prevent data disclosure). In this case, the application server can maintain a table of a mapping relationship between a user ID and a private key in the TEE (in other words, the private key varies with user). If needed, the user's private key is obtained to decrypt the encrypted data to obtain the application data.

Further, the application server can provide a common pair of public key and private key by using the TEE. Data provided by clients are encrypted by using the public key. The private key is only maintained by the TEE, that is, the user does not know the private key. In other words, the clients correspond to the same public key and private key, the private key can be obtained only in the TEE to decrypt the application data provided by the user. As such, maintenance overheads of the application server are reduced because users correspond to the same pair of public key and private key.

In an implementation, after sending the operation record to the database server, the application server can receive a hash value that corresponds to the operation record and that is returned by the database server. The hash value is generated by the database server based on a predetermined algorithm, and can include a digital signature provided by the database server, thereby ensuring that the hash value is provided by the database server. Other users (including the application server or clients served by the application server) can initiate query or verification to the database server based on the hash value.

After receiving the hash value, the application server can locally store the hash value. For example, a mapping relationship can be established between the value of the count included in the operation record and the hash value of the operation record, and written to an index. In addition, the hash value can be forwarded to the first client and the second client related to the operation record, so that the user can query or verify the hash value at any time.

For example, in a shared learning scenario, as shown in FIG. 1, organization A, organization B, and organization C jointly conduct risk model training on the application server, and jointly maintain training code used for the risk model training. Any party knows specific content of the code. In addition, A, B, and C each provide several training samples including user data to the application server. For data confidentiality, the application server maintains the pair of public key and private key by using the TEE, and uses the public key to encrypt the data in the data pool, to ensure that user data is not disclosed.

A uses the data in the data pool (that is, needs to use the training samples provided by B and C) to perform model training. The training is performed as follows: decrypt the data in the data pool by using the private key in the TEE, and use the decrypted training samples as the input to execute the previously described training code in the TEE. Each time the training code is executed, the count is increased by 1. A counting result is digitally signed by the TEE. As such, an operation log including the execution party A and the data providers B and C is generated. In addition, a mapping relationship is established between the operation log and a corresponding count. An operation record including the operation log and the count is generated and sent to the clients of A, B, and C and the database server.

In a shared training method, the operation log can further include a training model obtained from the current training code execution.

Figure 3:
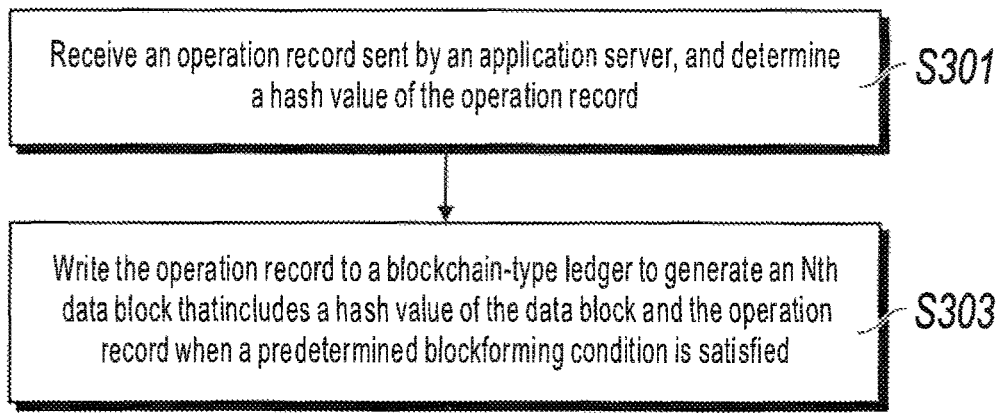
FIG. 3 is a schematic flowchart illustrating another method for storing an operation record, according to an implementation of the present specification.

According to another aspect, an implementation of the present specification further provides a method for storing an operation record based on a TEE. The method is applied to a database server. FIG. 3 is a schematic flowchart illustrating a method for storing an operation record, according to an implementation of the present specification. The method includes the following steps.

S301. Receive an operation record sent by an application server, and determine a hash value of the operation record, where the operation record includes an operation log and a quantity K+1 of execution times of operation code.

Specific content of the operation record is described previously and is omitted here. A specific algorithm of the hash value, such as SHA-1, SHA-224, SHA-256, SHA-384, or SHA-512, can be determined based on an actual need.

S303. Write the operation record to a blockchain-type ledger to generate an Nth data block that includes a hash value of the data block and the operation record, when a predetermined block forming condition is satisfied. A blockchain-type ledger includes a ledger that stores data based on a blockchain data structure (e.g., in a form of a blockchain).

The predetermined block forming condition includes the following: a quantity of operation records to be stored reaches a quantity threshold. For example, each time one thousand operation records are received, a new data block is generated, and the one thousand operation records are written to the block. Or the predetermined block forming condition can be that a time interval from a previous block forming moment reaches a time threshold. For example, a new data block is generated every five minutes, and operation records received within these five minutes are written to the block.

In practice, operation records are not frequently generated. Therefore, for a ledger of each type of code, one data block can be created for each operation record.

Here, N indicates the serial number of the data block. In other words, in the present implementation of the present specification, data blocks are arranged in the form of a blockchain in a sequence of block forming time, and have a significant time sequence characteristic. The height of the data block increases monotonically in the sequence of block forming time. The height can be a serial number. In this case, the height of the Nth data block is N. The height can be alternatively generated by using another method. For example, the block forming time of the data block is symmetrically encrypted and converted to large integer data that increases monotonically, and the large integer data is used as the height.

When N=1, the data block is an initial data block. The hash value and height of the initial data block are given based on a predetermined method. For example, the initial data block includes only metadata such as a user ID and user authority without an operation record. The hash value of the data block is any given hash value, and the height blknum is equal to 0. For another example, a trigger condition for generating the initial data block is consistent with a trigger condition for generating other data blocks, but the hash value of the initial data block is determined by hashing content in the initial data block.

When N>1, since the content and hash value of the previous data block are determined, the hash value of the current data block (the Nth data block) can be generated based on the hash value of the previous data block (that is, an (N−1)th data block). For example, a feasible method is as follows: determine a hash value of each operation record to be written to the Nth data block; generate a Merkle tree based on the sequence of the operation records in the data block; combine a root hash value of the Merkle tree and the hash value of the previous data block; and generate the hash value of the current data block by using the hash algorithm. For another example, combination and hashing can be performed based on the sequence of operation records in the data block, to obtain a hash value of the overall operation record. The hash value of the previous data block and the hash value of the overall operation record are combined to obtain a string. A hash operation is performed on the obtained string to generate the hash value of the current data block.

After successfully storing the operation record, the database server can obtain the hash value of the corresponding operation record and the hash value of the data block that includes the operation record, and send the hash values to the application server. The application server forwards the hash values to the client. Or the database server can directly send the hash values to the client so that the client can initiate integrity verification based on the hash values. A specific verification method is recalculating the hash value of the operation record and the hash value of the data block including the operation record in the database, and comparing the hash values with a hash value stored locally.

In the previous data block generation method, each data block is determined based on a hash value. The hash value of the data block is determined by the content and sequence of operation records in the data block and the hash value of the previous data block. A user can initiate verification based on the hash value of the data block at any time. A modification to any content in the data block (including a modification to the content or sequence of operation records in the data block) can lead to inconsistency between the hash value of the data block calculated during verification and the hash value obtained when the data block is generated. The inconsistency causes the verification to fail. As such, the operation records are centralized and tamperproof.

Since the operation records include a consecutive count sequence, the database server can set a corresponding ledger for each piece of operation code. As such, the ledgers store the operation records that include consecutive counts. The user can further query and verify the execution status of the operation code at any time.

Verification on a blockchain-type ledger usually means continuous integrity verification on a specified data block or continuous integrity verification starting from the initial data block. A verification method is as follows: obtain the hash value of the previous data block; recalculate the hash value of the data block based on the operation record in the data block and the hash value of the previous data block by using the algorithm that is used for generating the hash value of the data block; and compare the recalculated hash value with the hash value of the previous data block.

According to the solution provided in the present implementation of the present specification, when a user performs a data operation on a platform, the platform executes predetermined code in the TEE to perform an operation on data selected by the user, and generates a corresponding operation log. In addition, counting is performed when the predetermined code is executed in the TEE. The count is increased by 1 each time the code is executed. The operation log and a counting result are combined and written to a blockchain-type ledger on the database server. As such, an undeniable evidence of consecutive counts is formed in the blockchain-type ledger. Any user can check the ledger at any time to determine how many times the user's data has been used, and who uses the data. Therefore, a record related to data use is tamperproof.

Figure 4:
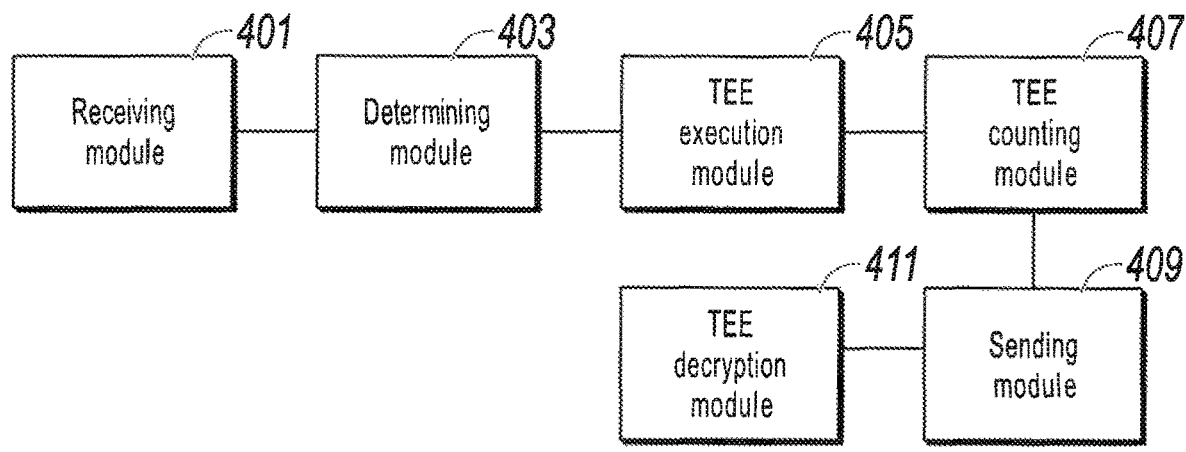
FIG. 4 is a schematic structural diagram illustrating an operation record storage apparatus applied to an application server, according to an implementation of the present specification.

Corresponding to the one aspect, an implementation of the present specification further provides an apparatus for storing an operation record based on a TEE. The apparatus is applied to an application server. FIG. 4 is a schematic structural diagram illustrating an operation record storage apparatus applied to an application server, according to an implementation of the present specification. The apparatus includes: a receiving module 401, configured to receive an operation instruction sent by a first client, and determine needed application data based on the operation instruction; a determining module 403, configured to determine one or more second clients corresponding to the application data; a TEE execution module 405, configured to execute predetermined operation code in the TEE based on the application data, and generate an operation log with respect to the application data; a TEE counting module 407, configured to determine a quantity K of execution times of the operation code before the operation code is executed, and change the quantity of execution times to K+1 when the operation code is executed; and a sending module 409, configured to generate an operation record that includes the operation log and the quantity K+1 of execution times, and send the operation record to a database server, the first client, and the second client, so that the database server stores the operation record.

If the application data is encrypted by using a public key, the apparatus further includes a TEE decryption module 411, configured to obtain a private key of the second client, and use the private key to decrypt encrypted application data corresponding to the second client to obtain the application data in the TEE.

The receiving module 401 is further configured to receive a hash value of the operation record determined by a data server. The sending module is further configured to forward the hash value to the first client and the second client.

The application data further includes a training sample. The operation code includes model training code with respect to the training sample. The operation log includes a training model obtained from the current training.

Figure 5:
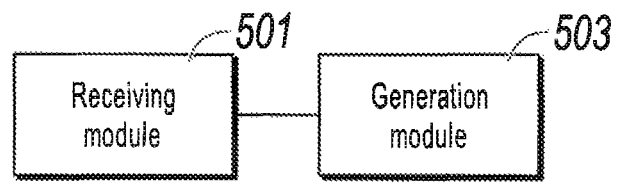
FIG. 5 is a schematic structural diagram illustrating an operation record storage apparatus, according to an implementation of the present specification.

Corresponding to the another aspect, an implementation of the present specification further provides an apparatus for storing an operation record based on a TEE. FIG. 5 is a schematic structural diagram illustrating an operation record storage apparatus, according to an implementation of the present specification. The apparatus is applied to a database server and includes: a receiving module 501, configured to receive an operation record sent by an application server, and determine a hash value of the operation record, where the operation record includes an operation log and a quantity K+1 of execution times of operation code, and the operation record is generated by the application server in the TEE; and a generation module 503, configured to write the operation record to a blockchain-type ledger to generate an Nth data block that includes a hash value of the data block and the operation record when a predetermined block forming condition is satisfied, specifically including: when N=1, giving a hash value and height of an initial data block based on a predetermined method; or when N>1, determining the hash value of the Nth data block based on operation records to be written to the data block and a hash value of an (N−1)th data block, and generating the Nth data block that includes the hash value of the Nth data block and the operation records, where the height of the data block increases monotonically in a sequence of block forming time.

The apparatus further includes a sending module 505, configured to send the hash value of the operation record to the application server.

Further, the predetermined block forming condition includes the following: a quantity of operation records to be stored reaches a quantity threshold, or a time interval from a previous block forming moment reaches a time threshold.

An implementation of the present specification further provides a computer device. The computer device includes at least a memory, a processor, and a computer program that is stored in the memory and that can run on the processor. When the processor executes the program, the method for storing an operation record shown in FIG. 2 is implemented.

An implementation of the present specification further provides a computer device. The computer device includes at least a memory, a processor, and a computer program that is stored in the memory and that can run on the processor. When the processor executes the program, the method for storing an operation record shown in FIG. 3 is implemented.

Figure 6:
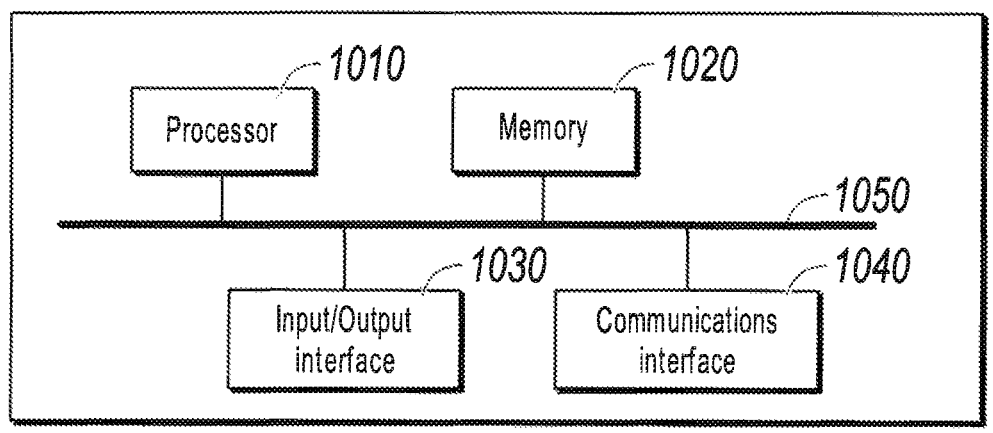
FIG. 6 is a schematic structural diagram of a device for configuring a method in an implementation of the present specification.

FIG. 6 is a schematic diagram illustrating a more detailed hardware structure of a computing device, according to an implementation of the present specification. The device can include a processor 1010, a memory 1020, an input/output interface 1030, a communications interface 1040, and a bus 1050. The processor 1010, the memory 1020, the input/output interface 1030, and the communications interface 1040 are communicatively connected in the device through the bus 1050.

The processor 1010 can be implemented in a form of a general-purpose central processing unit (CPU), a microprocessor, an application specific integrated circuit (ASIC), one or more integrated circuits, etc., and is configured to execute a related program to implement the technical solutions provided in the implementations of the present specification.

The memory 1020 can be implemented in a form of a read-only memory (ROM), a random access memory (RAM), a static storage device, a dynamic storage device, etc. The memory 1020 can store an operating system and another application program. When the technical solutions provided in the implementations of the present specification are implemented by using software or firmware, related program code is stored in the memory 1020, and is called and executed by the processor 1010.

The input/output interface 1030 is configured to connect an input/output module to input and output information. The input/output module can be disposed as a component in the device (not shown in the figure), or can be externally connected to the device to provide a corresponding function. An input device can include a keyboard, a mouse, a touchscreen, a microphone, various sensors, etc. An output device can include a display, a speaker, a vibrator, an indicator, etc.

The communications interface 1040 is configured to connect to a communications module (not shown in the figure) to implement communication and interaction between the device and another device. The communications module can implement communication in a wired manner (for example, a USB or a network cable) or a wireless manner (for example, a mobile network, Wi-Fi, or Bluetooth).

The bus 1050 includes a channel for transmitting information between components (such as the processor 1010, the memory 1020, the input/output interface 1030, and the communications interface 1040) of the device.

It is worthwhile to note that, although only the processor 1010, the memory 1020, the input/output interface 1030, the communications interface 1040, and the bus 1050 are shown for the device, in a specific implementation process, the device can further include other components needed for normal operation. In addition, a person skilled in the art can understand that the device can include only components needed for implementing the solutions in the implementations of the present specification, instead of including all the components shown in the figure.

An implementation of the present specification further provides a computer readable storage medium. A computer program is stored on the computer readable storage medium. When the program is executed by a processor, the method for storing an operation record shown in FIG. 2 is implemented.

An implementation of the present specification further provides a computer readable storage medium. A computer program is stored on the computer readable storage medium. When the program is executed by a processor, the method for storing an operation record shown in FIG. 3 is implemented.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD) or another optical storage, a cassette, a cassette magnetic disk storage, or another magnetic storage device or any other non-transmission medium. The computer storage medium can be configured to store information that can be accessed by a computing device. As described in the present application, the computer readable medium does not include computer readable transitory media, such as a modulated data signal and a carrier.

It can be seen from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be implemented by using a computer chip or an entity, or can be implemented by using a product having a certain function. A typical implementation device is a computer. The computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations of the present specification are described in a progressive way. For same or similar parts of the implementations, references can be made to the implementations mutually. Each implementation focuses on a difference from other implementations. Particularly, an apparatus implementation is similar to a method implementation, and therefore is described briefly. For a related part, references can be made to some descriptions in the method implementation. The previously described apparatus implementations are merely examples. The modules described as separate parts can or cannot be physically separate. During implementation of the solutions in the implementations of the present application, functions of the modules can be implemented in one or more pieces of software and/or hardware. Some or all of the modules can be selected based on an actual need to implement the solutions in the implementations. A person of ordinary skill in the art can understand and implement the implementations of the present specification without creative efforts.

The previous descriptions are merely specific implementations of the implementations of the present application. It is worthwhile to note that a person of ordinary skill in the art can further make several improvements or polishing without departing from the principle of the implementations of the present application, and the improvements or polishing shall fall within the protection scope of the implementations of the present application.

What is claimed is:

1. A computer-implemented method for record storage based on a trusted execution environment (TEE), comprising:
   receiving operation instructions sent by a first client device, wherein the operation instructions indicates application data to be used for performing one or more operations, wherein the application data comprises sample data used to train a machine-learning model;
   determining the application data based on the operation instructions;
   determining one or more second client devices associated with the application data;
   determining operation codes in the TEE associated with the application data to be executed to perform the one or more operations, wherein the operation codes comprise codes of the machine-learning model;
   determining that the operation codes have been executed for K times based on an indicator, where K is a non-negative integer;
   executing the operation codes in the TEE based on the application data to generate an operation log, wherein the operation log comprises a trained machine-learning model obtained from training the machine-learning model based on the sample data;
   updating an indicator indicating a number of times the operation codes are executed from K to K+1, where K is a non-negative integer; and
   sending the operation log and the indicator, as an operation record, to a database server, the first client device, and the one or more second client devices to be stored.

2. The computer-implemented method of claim 1, wherein the application data is encrypted by using a public key and is decrypted by the one or more second client devices by using a private key obtained from the TEE corresponding to the public key.

3. The computer-implemented method of claim 1, further comprising:
   receiving, from the database server, a hash value of the operation record; and
   sending the hash value to the first client device and the one or more second client devices.

4. The computer-implemented method of claim 1, wherein the operation record is recorded to a blockchain-type ledger by the database server to generate a data block that comprises a hash value of the data block and the operation record, wherein a block height of the data block is greater than a block height of a previous data block.

5. The computer-implemented method of claim 4, wherein a hash value of the operation record is sent to an application server.

6. The computer-implemented method of claim 4, wherein the data block is generated in response to determining that a predetermined condition is satisfied, and wherein the predetermined condition is one of a volume of the operation record reaches a predetermined threshold or a last data block has been generated for a predetermined time.

7. A computer-implemented system for storing record storage based on a trusted execution environment (TEE), comprising:
   one or more processors; and
   one or more computer-readable memories coupled to the one or more processors and having instructions stored thereon that are executable by the one or more processors to perform one or more operations comprising:
      receiving operation instructions sent by a first client device, wherein the operation instructions indicates application data to be used for performing one or more operations, wherein the application data comprises sample data used to train a machine-learning model;
      determining the application data based on the operation instructions;
      determining one or more second client devices associated with the application data;
      determining operation codes in the TEE associated with the application data to be executed to perform the one or more operations, wherein the operation codes comprise codes of the machine-learning model;
      determining that the operation codes have been executed for K times based on an indicator, where K is a non-negative integer;
      executing the operation codes in the TEE based on the application data to generate an operation log, wherein the operation log comprises a trained machine-learning model obtained from training the machine-learning model based on the sample data;
      updating an indicator indicating a number of times the operation codes are executed from K to K+1, where K is a non-negative integer; and
      sending the operation log and the indicator as an operation record to a database server, the first client device, and the one or more second client devices to be stored.

8. The computer-implemented system of claim 7, wherein the application data is encrypted by using a public key and is decrypted by the one or more second client devices by using a private key obtained from the TEE corresponding to the public key.

9. The computer-implemented system of claim 7, further comprising:
   receiving, from the database server, a hash value of the operation record; and
   sending the hash value to the first client device and the one or more second client devices.

10. The computer-implemented system of claim 7, wherein the operation record is recorded to a blockchain-type ledger by the database server to generate a data block that comprises a hash value of the data block and the operation record, wherein a block height of the data block is greater than a block height of a previous data block.

11. The computer-implemented system of claim 10, wherein a hash value of the operation record is sent to an application server.

12. The computer-implemented system of claim 10, wherein the data block is generated in response to determining that a predetermined condition is satisfied, and wherein the predetermined condition is one of a volume of the operation record reaches a predetermined threshold or a last data block has been generated for a predetermined time.

13. A non-transitory, computer-readable medium storing one or more instructions executable by a computer-implemented authentication system to perform one or more operations for record storage based on a trusted execution environment (TEE), comprising:

receiving operation instructions sent by a first client device, wherein the operation instructions indicates application data to be used for performing one or more operations, wherein the application data comprises sample data used to train a machine-learning model;

determining the application data based on the operation instructions;

determining one or more second client devices associated with the application data;

determining operation codes in the TEE associated with the application data to be executed to perform the one or more operations, wherein the operation codes comprise codes of the machine-learning model;

determining that the operation codes have been executed for K times based on an indicator, where K is a non-negative integer;

executing the operation codes in the TEE based on the application data to generate an operation log, wherein the operation log comprises a trained machine-learning model obtained from training the machine-learning model based on the sample data;

updating an indicator indicating a number of times the operation codes are executed from K to K+1, where K is a non-negative integer; and sending the operation log and the indicator as an operation record to a database server, the first client device, and the one or more second client devices to be stored.

14. The non-transitory, computer-readable medium of claim 13, wherein the application data is encrypted by using a public key and is decrypted by the one or more second client devices by using a private key obtained from the TEE corresponding to the public key.

15. The non-transitory, computer-readable medium of claim 13, further comprising:

receiving, from the database server, a hash value of the operation record; and sending the hash value to the first client device and the one or more second client devices.

16. The non-transitory, computer-readable medium of claim 13, wherein the operation record is recorded to a blockchain-type ledger by the database server to generate a data block that comprises a hash value of the data block and the operation record, wherein a block height of the data block is greater than a block height of a previous data block.

17. The non-transitory, computer-readable medium of claim 16, wherein a hash value of the operation record is sent to an application server.

18. The non-transitory, computer-readable medium of claim 16, wherein the data block is generated in response to determining that a predetermined condition is satisfied, and wherein the predetermined condition is one of a volume of the operation record reaches a predetermined threshold or a last data block has been generated for a predetermined time.

* * * * *